United States Patent Office 2,864,786
Patented Dec. 16, 1958

2,864,786

CERTAIN POLYEPOXIDE TREATED DERIVATIVES OF MONOEPOXIDE-AMINE MODIFIED-RESINS, AND METHOD OF MAKING SAME

Melvin De Groote, St. Louis, and Kwan-Ting Shen, Brentwood, Mo., assignors to Petrolite Corporation, Wilmington, Del., a corporation of Delaware No Drawing. Original application June 10, 1953, Serial No. 360,842, now Patent No. 2,792,361, dated May 14, 1957. Divided and this application September 11, 1956, Serial No. 609,092

12 Claims. (Cl. 260—43)

The present invention is a continuation-in-part of our copending application, Serial No. 350,532, filed April 22, 1953, now U. S. Patent 2,771,431, and a division of our copending application Serial No. 360,842, filed June 10, 1953, now U. S. Patent 2,792,361.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

The present invention is concerned with a 3-step manufacturing process involving (1) condensing certain phenol aldehyde resins, hereinafter described in detail, with certain basic hydroxylated secondary monoamines, hereinafter described in detail, and formaldehyde; (2) oxyalkylation of the condensation product with certain monoepoxides, hereinafter described in detail; and (3) oxyalkylation of the previously oxyalkylated resin condensate with certain non-aryl polyepoxides, also hereinafter described in detail.

The present invention is characterized by the use of compounds derived from diglycidyl ethers which do not introduce any hydrophobe properties in its usual meaning but in fact are more apt to introduce hydrophile properties. Thus, the diepoxides employed in the present invention are characterized by the fact that the divalent radical connecting the terminal epoxide radicals contains less than 5 carbon atoms in an uninterrupted chain.

The diepoxides employed in the present process are obtained from glycols such as ethylene glycol, diethylene glycol, propylene glycol, dipropylene glycol, tripropylene glycol, glycerol, diglycerol, triglycerol, and similar compounds. Such products are well known and are characterized by the fact that there are not more than 4 uninterrupted carbon atoms in any group which is part of the radical joining the epoxide groups. Of necessity such diepoxides must be nonaryl or aliphatic in character. The diglycidyl ethers of co-pending application, Serial No. 350,532, are invariably and inevitably aryl in character.

The diepoxides employed in the present process are usually obtained by reacting a glycol or equivalent compound, such as glycerol or diglycerol, with epichlorohydrin and subsequently with an alkali. Such diepoxides have been described in the literature and particularly the patent literature.

Reference to being thermoplastic characterizes products as being liquids at ordinary temperature or readily convertible to liquids by merely heating below the point of pyrolysis and thus differentiates them from infusible resins. Reference to being soluble in an organic solvent means any of the usual organic solvents such as alcohols, ketones, esters, ethers, mixed solvents, etc. Reference to solubility is merely to differentiate from a reactant which is not soluble and might be not only insoluble but also infusible. Furthermore, solubility is a factor insofar that it sometimes is desirable to dilute the compound containing the epoxy rings before reacting with an oxyalkylated amine condensate. In such instances, of course, the solvent selected would have to be one which is not susceptible to oxyalkylation, as, for example, kerosene, benzene, toluene, dioxane, possibly various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxy rings or oxirane rings in the alpha-omega position. This is a departure from the standpoint of strictly formal nomenclature as in the example of the simplest diepoxide which contains at least 4 carbon atoms and is formally described as 1,2-epoxy-3,4-epoxybutane(1,2,3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric compounds containing an average of more than one epoxide group per molecule and free from functional groups other than epoxide and hydroxyl groups. The compounds here included are limited to the monomers or the low molal members of such series and generally contain two epoxide rings per molecule and may be entirely free from a hydroxyl group. This is important because the instant invention is directed towards products which are not insoluble resins and have certain solubility characteristics not inherent in the usual thermosetting resins. Simply for purpose of illustration to show a typical diglycidyl ether of the kind herein employed reference is made to the following formula:

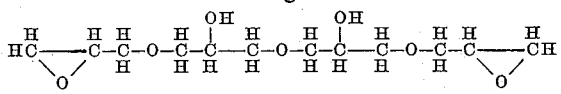

or if derived from cyclic diglycerol the structure would be thus:

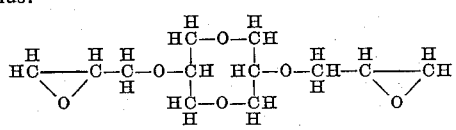

or the equivalent compound wherein the ring structure involves only 6 atoms, thus:

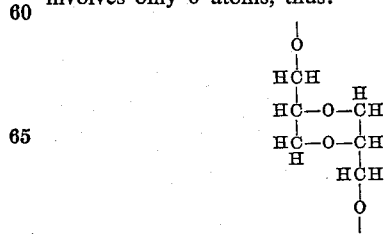

Commercially available compounds seem to be largely the former with comparatively small amounts, in fact, comparatively minor amounts, of the latter.

Having obtained an acyclic reactant having generally 2 epoxy rings as depicted in the next to last formula preceding, or low molal polymers thereof, it becomes obvious the reaction can take place with any oxyalkylated phenol-aldehyde resin condensate by virtue of the fact that there are always present either phenolic hydroxyl radicals or alkanol radicals resulting from the oxyalkylation of the phenolic hydroxyl radicals; there may be present reactive hydrogen atoms attached to a nitrogen atom or an oxygen atom, depending on whether initially there was present a hydroxylated group attached to an amino hydrogen group or a secondary amino group. In any event there is always a multiplicity of reactive hydrogen atoms present in the oxyalkylated amine-modified phenol-aldehyde resin.

To illustrate the products which represent the subject matter of the present invention reference will be made to a reaction involving a mole of the oxyalkylating agent, i. e., the compound having 2 oxirane rings and an oxyalkylated amine condensate. Proceeding with the example previously described it is obvious the reaction ratio of 2 moles of the oxyalkylated amine condensate to one mole of the oxyalkylating agent gives a product which may be indicated as follows:

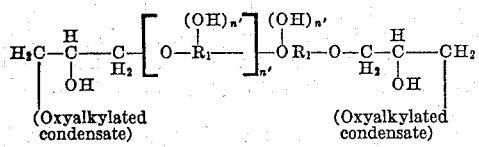

(Oxyalkylated condensate)  (Oxyalkylated condensate)

in which $n'$ is a small whole number less than 10, and usually less than 4, and including 0, and $R_1$ represents a divalent radical as previously described being free from any radical having more than 4 uninterrupted carbon atoms in a single chain, and the characterization "oxyalkylated condensate" is simply an abbreviation for the condensate which is described in greater detail subsequently.

Such final product in turn also must be soluble but solubility is not limited to an organic solvent but may include water, or for that matter, a solution of water containing an acid such as hydrochloric acid, acetic acid, hydroxyacetic acid, etc. In other words, the nitrogen groups present, whether two or more, may or may not be significantly basic and it is immaterial whether aqueous solubility represents an anhydro base or the free base (combination with water) or a salt form such as the acetate, chloride, etc. The purpose in this instance is to differentiate from insoluble resinous materials, particularly those resulting from gelation or cross-linking. Not only does this property serve to differentiate from instances where an insoluble material is desired, but also serves to emphasize the fact that in many instances the preferred compounds have distinct water-solubility or are distinctly dispersible in 5% gluconic acid. For instance, the products freed from any solvent can be shaken with 5 to 20 times their weight of 5% gluconic acid at ordinary temperature and show at least some tendency towards being self-dispersing. The solvent which is generally tried is xylene. If xylene alone does not serve then a mixture of xylene and methanol, for instance, 80 parts of xylene and 20 parts of methanol, or 70 parts of xylene and 30 parts of methanol, can be used. Sometimes it is desirable to add a small amount of acetone to the xylene-methanol mixture, for instance, 5% to 10% of acetone. As oxyalkylation proceeds the significance of the basicity of any nitrogen group is obviously diminished.

The polyepoxide-treated condensates obtained in the manner described are, in turn, oxyalkylation-susceptible and valuable derivatives can be obtained by further reaction with ethylene oxide, propylene oxide, ethylene imine, etc.

Similarly, the polyepoxide-derived compounds can be reacted with a product having both a nitrogen group and a 1,2-epoxy group, such as 3-dialkylaminoepoxypropane. See U. S. Patent No. 2,520,093, dated August 22, 1950, to Gross.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example for cosmetics, spray oils, water-repellent textile finishes; as lubricants, etc.

As far as the use of the herein described products goes for purpose of resolution of petroleum emulsions of the water-in-oil type, we particularly prefer to use those which as such or in the form of the free base or hydrate, i. e., combination with water or particularly in the form of a low molal organic acid salt such as the gluconates or the acetate or hydroxy acetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For purpose of convenience, what is said hereinafter will be divided into eight parts:

Part 1 is concerned with the hydrophile nonaryl polyepoxides and particularly diepoxides employed as reactants;

Part 2 is concerned with the phenol-aldehyde resin which is subjected to modification by condensation reaction to yield an amine-modified resin;

Part 3 is concerned with appropriate basic hydroxylated secondary monoamines which may be employed in the preparation of the herein-described amine-modified resins;

Part 4 is concerned with reactions involving the resin, the amine, and formaldehyde to produce specific products or compounds which are then subjected to oxyalkylation with monoepoxides;

Part 5 is concerned with the oxyalkylation of the products described in Part 4, preceding;

Part 6 is concerned with reactions involving the two preceding types of materials and examples obtained by such reactions. Generally speaking, this involves nothing more than a reaction between two moles of a previously prepared oxyalkylated amine-modified phenol-aldehyde resin condensate as described and one mole of a polyepoxide so as to yield a new and larger resin molecule or comparable product;

Part 7 is concerned with the resolution of petroleum emulsions of the water-in-oil type by means of the previously described chemical compounds or reaction products; and Part 8 is concerned with uses for the products herein described either as such or after modification, including any applications other than those involving resolution of petroleum emulsions of the water-in-oil type.

PART 1

Reference is made to various patents as illustrated in the manufacture of the nonaryl polyepoxides and particularly diepoxides employed as reactants in the instant invention. More specifically, such patents are the following: Italian Patent No. 400,973, dated August 8, 1941; British Patent No. 518,057, dated December 10, 1938; U. S. Patent No. 2,070,990, dated February 16, 1937 to Groll et al; and U. S. Patent No. 2,581,464, dated January 8, 1952, to Zech. The simplest diepoxide is probably the one derived from 1,3-butadiene or isoprene. Such derivatives are obtained by the use of peroxides or by other suitable means and the diglycidyl ethers may be indicated thus:

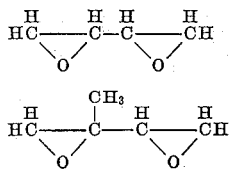

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent No. 400,973:

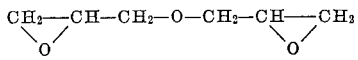

Another type of diepoxide is diisobutenyl dioxide as described in aforementioned U. S. Patent No. 2,070,990, dated February 16, 1937, to Groll, and is of the following formula

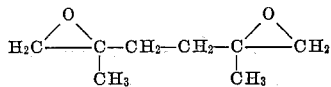

The diepoxides previously described may be indicated by the following formula:

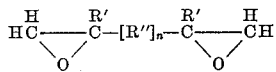

in which R′ represents a hydrogen atom or methyl radical and R″ represents the divalent radical uniting the two terminal epoxide groups, and $n'$ is the numeral 0 or 1. As previously pointed out, in the case of the butadiene derivative, $n'$ is 0. In this case of diisobutenyl dioxide R″ is CH$_2$—CH$_2$ and $n'$ is 1. In another example previously referred to R″ is CH$_2$OCH$_2$ and $n'$ is 1.

However, for practical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof in that the epichlorohydrin itself may supply the glycerol or diglycerol radical in addition to the epoxy rings. As has been suggested previously, instead of starting with glycerol or a glycerol derivative, one could start with any one of a number of glycerols or polyglycols and it is more convenient to include as part of the terminal oxirane ring radical the oxygen atom that was derived from epichlorohydrin or, as might be the case, methyl epichlorohydrin. So presented the formula becomes:

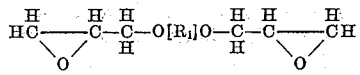

In the above formula R$_1$ is selected from groups such as the following:

C$_2$H$_4$
C$_2$H$_4$OC$_2$H$_4$
C$_2$H$_4$OC$_2$H$_4$OC$_2$H$_4$
C$_3$H$_6$
C$_3$H$_6$OC$_3$H$_6$
C$_3$H$_6$OC$_3$H$_6$OC$_3$H$_6$
C$_4$H$_8$
C$_4$H$_8$OC$_4$H$_8$
C$_4$H$_8$OC$_4$H$_8$OC$_4$H$_8$
C$_3$H$_5$(OH)
C$_3$H$_5$(OH)OC$_3$H$_5$(OH)
C$_3$H$_5$(OH)OC$_3$H$_5$OC$_3$H$_5$(OH)

It is to be noted that in the above epoxides there is a complete absence of (a) aryl radicals and (b) radicals in which 5 or more carbon atoms are united in a single uninterrupted single group. R$_1$ is inherently hydrophile in character as indicated by the fact that it is specified that the precursory diol or polyol HOROH must be water-soluble in substantially all proportions, i. e., water miscible.

Stated another way, what is said previously means that a polyepoxide such as

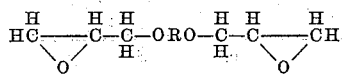

is derived actually or theoretically, or at least derivable, from the diol HOROH, in which the oxygen-linked hydrogen atoms were replaced by

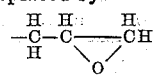

Thus, R(OH)$_n$, where $n$ represents a small whole number which is 2 or more, must be water-soluble. Such limitation excludes polyepoxides if actually derived or theoretically derived at least, from water-insoluble diols or water-insoluble triols or higher polyols. Suitable polyols may contain as many as 12 to 20 carbon atoms or thereabouts.

Referring to a compound of the type above in the formula

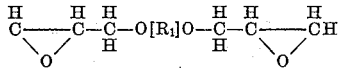

in which R$_1$ is C$_3$H$_5$(OH) it is obvious that reaction with another mole of epichlorohydrin with appropriate ring closure would produce a triepoxide or, similarly, if R happened to be C$_3$H$_5$(OH)OC$_3$H$_5$(OH), one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

Using laboratory procedure we have reacted diethyleneglycol with epichlorohydrin and subsequently with alkali so as to produce a product which, on examination, corresponded approximately to the following compound:

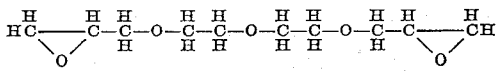

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds is to use the terminology "epoxyalkanes," and, more particularly, polyepoxyalkanes or diepoxyalkanes. The difficulty is that the majority of these compounds represent types in which a carbon atom chain is interrupted by an oxygen atom, and, thus, they are not strictly alkane derivatives. Furthermore, they may be hydroxylated or represent a heterocyclic ring. The principal class properly may be referred to as polyepoxy polyglycerols, or diepoxypolyglycerols.

Other examples of diepoxides involving a heterocyclic ring having, for example, 3 carbon atoms and 2 oxygen atoms, are obtainable by the conventional reaction of combining erythritol with a carbonyl compound, such as formaldehyde or acetone so as to form the 5-membered ring, followed by conversion of the terminal hydroxyl groups into epoxy radicals.

PART 2

It is well known that one can readily purchase on the open market, or prepare, fusible, organic solvent-soluble, water-insoluble resin polymers of a composition approximated in an idealized form by the formula

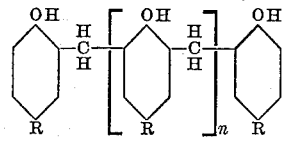

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 15 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance, paraphenylphenol, one may obtain a resin which is not soluble in a nonoxygenated solvent, such as benzene, or xylene, but requires an oxygenated solvent such as a low molal alcohol, dioxane, or diethyleneglycol diethylether. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser. In said patent there are described oxyalkylation-susceptible, fusible, nonoxygenated-organic solvent-soluble, water-insoluble, low-stage phenolaldehyde resins, having an average molecular weight corresponding to at least 3 and not over 6 phenolic nuclei per resin molecule. These resins are difunctional only in regard to methylol-forming reactivity, are derived by reaction between a difunctional monohydric phenol and an aldehyde having not over 8 carbon atoms and reactive toward said phenol, and are formed in the substantial absence of trifunctional phenols. The phenol is of the formula

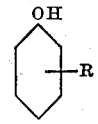

in which R is an aliphatic hydrocarbon radical having at least 4 carbon atoms and not more than 24 carbon atoms, and substituted in the 2,4,6 position.

If one selected a resin of the kind just described previously and reacted approximately one mole of the resin with two moles of formaldehyde and two moles of a basic hydroxylated secondary amine as specified, following the same idealized over-simplification previously referred to, the resultant product might be illustrated thus:

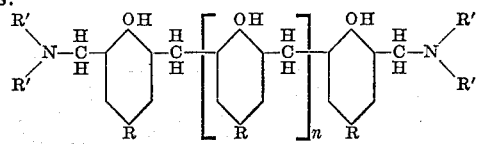

The basic hydroxylated amine may be designed thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

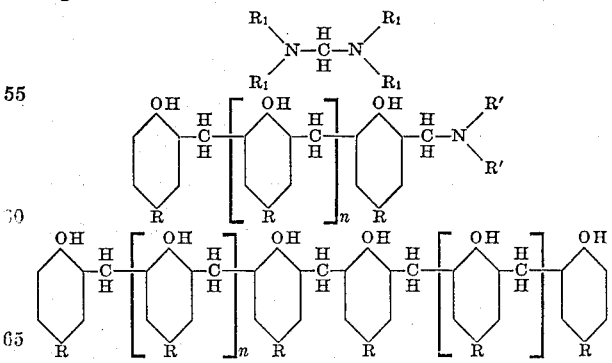

As has been pointed out previously, as far as the resin unit goes one can use a mole of aldehyde other than formaldehyde, such as acetaldehyde, propionaldehyde or butyraldehyde. The resin unit may be exemplified thus:

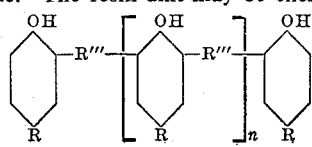

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximately 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purposes of convenience suitable resins are characterized in the following table:

Table I

| Example number | R | Position of R | R''' derived from— | $n$ | Mol. wt. of resin molecule (based on $n+2$) |
|---|---|---|---|---|---|
| 1a | Tertiary butyl | Para | Formaldehyde | 3.5 | 882.5 |
| 2a | Secondary butyl | Ortho | do | 3.5 | 882.5 |
| 3a | Tertiary amyl | Para | do | 3.5 | 959.5 |
| 4a | Mixed secondary and tertiary amyl | Ortho | do | 3.5 | 805.5 |
| 5a | Propyl | Para | do | 3.5 | 805.5 |
| 6a | Tertiary hexyl | do | do | 3.5 | 1,036.5 |
| 7a | Octyl | do | do | 3.5 | 1,190.5 |
| 8a | Nonyl | do | do | 3.5 | 1,267.5 |
| 9a | Decyl | do | do | 3.5 | 1,344.5 |
| 10a | Dodecyl | do | do | 3.5 | 1,498.5 |
| 11a | Tertiary butyl | do | Acetaldehyde | 3.5 | 945.5 |
| 12a | Tertiary amyl | do | do | 3.5 | 1,022.5 |
| 13a | Nonyl | do | do | 3.5 | 1,330.5 |
| 14a | Tertiary butyl | do | Butyraldehyde | 3.5 | 1,071.5 |
| 15a | Tertiary amyl | do | do | 3.5 | 1,148.5 |
| 16a | Nonyl | do | do | 3.5 | 1,456.5 |
| 17a | Tertiary butyl | do | Propionaldehyde | 3.5 | 1,008.5 |
| 18a | Tertiary amyl | do | do | 3.5 | 1,085.5 |
| 19a | Nonyl | do | do | 3.5 | 1,393.5 |
| 20a | Tertiary butyl | do | Formaldehyde | 4.2 | 996.6 |
| 21a | Tertiary amyl | do | do | 4.2 | 1,083.4 |
| 22a | Nonyl | do | do | 4.2 | 1,430.6 |
| 23a | Tertiary butyl | do | do | 4.8 | 1,094.4 |
| 24a | Tertiary amyl | do | do | 4.8 | 1,189.6 |
| 25a | Nonyl | do | do | 4.8 | 1,570.4 |
| 26a | Tertiary amyl | do | do | 1.5 | 604.0 |
| 27a | Hexyl | do | do | 1.5 | 653.0 |
| 28a | do | do | Acetaldehyde | 1.5 | 688.0 |
| 29a | Octyl | do | do | 1.5 | 786.0 |
| 30a | Nonyl | do | do | 1.5 | 835.0 |
| 31a | Octyl | do | Butyraldehyde | 2.0 | 986.0 |
| 32a | Nonyl | do | do | 2.0 | 1,028.0 |
| 33a | Amyl | do | do | 2.0 | 860.0 |
| 34a | Butyl | do | Formaldehyde | 2.0 | 636.0 |
| 35a | Amyl | do | do | 2.0 | 692.0 |
| 36a | Hexyl | do | do | 2.0 | 748.0 |

PART 3

As has been pointed out previously the amine herein employed as a reactant is a basic hydroxylated secondary monoamine whose composition is indicated thus:

in which R' represents a monovalent alkyl, alicyclic, arylalkyl radical which may be heterocyclic in a few instances as in a secondary amine derived from furfurylamine by reaction of ethylene oxide or propylene oxide. Furthermore, at least one of the radicals designated by R' must have at least one hydroxyl radical. A large number of secondary amines are available and may be suitably employed as reactants for the present purpose. Among others, one may employ diethanolamine, methyl ethanolamine, dipropanolamine and ethylpropanolamine. Other suitable secondary amines are obtained, of course, by taking any suitable primary amine, such as an alkylamine, an arylalkylamine, or an alicyclic amine, and treating the amine with one mole of an oxyalkylating agent, such as ethylene oxide, propylene oxide, butylene oxide, glycide, or methylglycide. Suitable primary amines which can be so converted into secondary amines, include butylamine, amylamine, hexylamine, higher molecular weight amines derived from fatty acids, cyclohexylamine, benzylamine, furfurylamine, etc. In other instances secondary amines which have at least one hydroxyl radical can be treated similarly with an oxyalkylating agent, or, for that matter, with an alkylating agent such as benzylchloride, esters of chloroacetic acid, alkyl bromides, dimethylsulfate, esters of sulfonic acid, etc., so as to convert the primary amine into a secondary amine. Among others, such amines include 2-amino-1-butanol, 2 - amino - 2 - methyl - 1 - propanol, 2-amino-2-methyl-1 - 3 - propanediol, - 2 - amino - 2-ethyl-1,3-propanediol, and tri(hydroxymethyl)-aminomethane. Another example of such amines is illustrated by 4-amino-4-methyl-2-pentanol.

Similarly, one can prepare suitable secondary amines which have not only a hydroxyl group but also one or more divalent oxygen linkages as part of an ether radical. Examples included are:

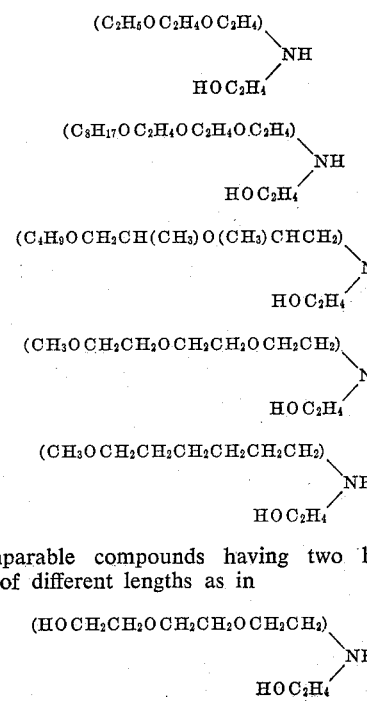

or comparable compounds having two hydroxylated groups of different lengths as in

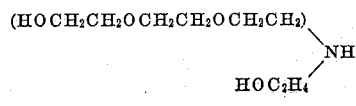

Other examples of suitable amines include alpha-methylbenzylamine and monoethanolamine; also amines obtained by treating cyclohexylmethylamine with one mole of an oxyalkylating agent as previously described; beta-ethylhexyl-butanolamine, diglycerylamine, etc. Another type of amines which is of particular interest because it includes a very definite hydrophile group includes sugar amines such as glucamine, galactamine and fructamine, such as N-hydroxyethylglucamine, N-hydroxyethylgalactamine, and N-hydroxyethylfructamine.

Other suitable amines may be illustrated by

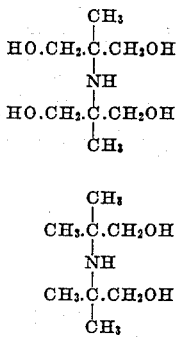

See, also, corresponding hydroxylated amines which can be obtained from rosin or similar raw materials and described in U. S. Patent No. 2,510,063, dated June 6, 1950, to Brief. Still other examples are illustrated by treatment of certain secondary amines, such as the following, with a mole of an oxyalkylating agent as described; phenoxethylamine, phenoxypropylamine, phenoxyalphamethylethylamine, and phenoxypropylamine.

Other procedures for production of suitable compounds having a hydroxyl group and a single basic amino-nitrogen atom can be obtained from any suitable alcohol or the like by reaction with a reagent which contains an epoxide group and a secondary amine group. Such reactants are described, for example, in U. S. Patents Nos. 1,977,251 and 1,977,253, both dated October 16, 1934, to Stallmann. Among the reactants described in said latter patent are the following:

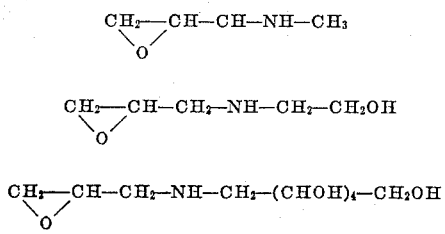

PART 4

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, we have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethyl-ether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable as in the case of ethyl or hexyl alcohol, and if there is to be subsequent oxyalkylation, then, obviously, the alcohols should not be used or else they should be removed. The fact that an oxygenated solvent need not be employed, of course, is an advantage for reasons stated.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc.

We have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. We have not found any case where it was necessary or even desirable to hold the low temperature stage for more than 24 hours. In fact, we are not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely dissolved. However, if the resin is prepared as such it may be added in solution form, just as preparation is described in aforementioned U. S. Patent 2,499,368. After the resin is in complete solution the amine is added and stirred. Depending on the amine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example, 35° C. or slightly lower, provided this initial low temperature stage is employed. The formaldehyde is then added in a suitable form. For reasons pointed out we prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C., for 4 or 5 hours, or at the most, up to 10–24 hours, we then complete the reaction by raising the temperature up to 150° C., or thereabouts as required. The initial low temperature procedure can be eliminated or reduced to merely the shortest period of time which avoids loss of amine or formaldehyde. At a higher temperature we use a phase-separating trap and subject the mixture to reflux condensation until the water of reaction and the water of solution of the formaldehyde is eliminated. We then permit the temperature to rise to somewhere about 100° C., and generally slightly above 100° C., and below 150° C., by eliminating the solvent or part of the solvent so the reaction mass stays within this predetermined range. This period of heating and refluxing, after the water is eliminated is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes we have invariably employed approximately one mole of the resin based on the molecular weight of the resin molecule, 2 moles of the secondary amine and 2 moles of formaldehyde. In some instances we have added a trace of caustic as an added catalyst but have found no particular advantage in this. In other cases we have used a slight excess of formaldehyde and, again, have not found any particular advantage in this. In other cases we have used a slight excess of amine and, again, have not found any particular advantage in so doing. Whenever feasible we have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted amine, if any is present, is another index.

In light of what has been said previously, little more need be said as to the actual procedure employed for the preparation of the herein described condensation products. The following example will serve by way of illustration.

Example 1b

The phenol-aldehyde resin is the one that has been identified previously as Example 2a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei, excluding the 2 external nuclei, or 5 and 6 overall nuclei. The resin so obtained in a neutral state had a light amber color.

882 grams of the resin identified as 2a preceding were powdered and mixed with 700 grams of xylene. The mixture was refluxed until solution was complete. It was then adjusted to approximately 30° to 35° C. and 210 grams of diethanolamine added. The mixture was stirred vigorously and formaldehyde added slowly. The formaldehyde used was a 37% solution and 160 grams were employed which were added in about 3 hours. The mixture was stirred vigorously and kept within a temperature range of 30° to 45° C. for about 21 hours. At the end of this period of time it was refluxed, using a phase-separating trap and a small amount of aqueous distillate withdrawn from time to time and the presence of unreacted formaldehyde noted. Any unreacted formaldehyde seemed to disappear within approximately 3 hours after the refluxing was started. As soon as the odor of formaldehyde was no longer detectible the phase-separating trap was set so as to eliminate all water of solution and reaction. After the water was eliminated part of the xylene was removed until the temperature reached about 150° C. The mass was kept at this higher temperature for about 3¾ hours and reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a sticky fluid or a tacky resin. The overall reaction time was a little over 30 hours. In other instances it has varied from approximately 24 to 36 hours. The time can be reduced by cutting the low temperature period to about 3 to 6 hours.

Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C. or thereabouts. Usually the mixture yielded a clear solution by the time the bulk of the water, or all of the water, had been removed.

Note that as pointed out previously, this procedure is illustrated by 24 examples in Table II.

Table II

| Ex. No. | Resin used | Amt., grs. | Amine used and amount | Strength of formaldehyde soln. and amt. | Solvent used and amt. | Reaction temp., °C. | Reaction time (hrs.) | Max. distill. temp., °C. |
|---|---|---|---|---|---|---|---|---|
| 1b | 2a | 882 | Diethanolamine, 210 g | 37%, 162 g | Xylene, 700 g | 22–26 | 32 | 137 |
| 2b | 5a | 480 | Diethanolamine, 105 g | 37%, 81 g | Xylene, 450 g | 21–23 | 28 | 150 |
| 3b | 10a | 633 | ....do.... | ....do.... | Xylene, 600 g | 20–22 | 36 | 145 |
| 4b | 2a | 441 | Dipropanolamine, 133 g | 30%, 100 g | Xylene, 400 g | 20–23 | 34 | 146 |
| 5b | 5a | 480 | ....do.... | ....do.... | Xylene, 450 g | 21–23 | 24 | 141 |
| 6b | 10a | 633 | ....do.... | ....do.... | Xylene, 600 g | 21–28 | 24 | 145 |
| 7b | 2a | 882 | Ethylethanolamine, 178 g | 37%, 162 g | Xylene, 700 g | 20–26 | 24 | 152 |
| 8b | 5a | 480 | Ethylethanolamine, 89 g | 37%, 81 g | Xylene, 450 g | 24–30 | 28 | 151 |
| 9b | 10a | 633 | ....do.... | ....do.... | Xylene, 600 g | 22–25 | 27 | 147 |
| 10b | 13a | 473 | Cyclohexylethanolamine, 143 g | 30%, 100 g | Xylene, 450 g | 21–31 | 31 | 146 |
| 11b | 14a | 511 | ....do.... | 37%, 81 g | ....do.... | 22–23 | 36 | 148 |
| 12b | 15a | 665 | ....do.... | ....do.... | Xylene, 550 g | 20–24 | 27 | 152 |
| 13b | 2a | 441 | $C_2H_5OC_2H_4OC_2H_4$ / $HOC_2H_4$ \NH, 176 g | ....do.... | Xylene, 400 g | 21–25 | 24 | 150 |
| 14b | 5a | 480 | $C_2H_5OC_2H_4OC_2H_4$ / $HOC_2H_4$ \NH, 176 g | ....do.... | Xylene, 450 g | 20–26 | 26 | 146 |
| 15b | 9a | 595 | $C_2H_5OC_2H_4OC_2H_4$ / $HOC_2H_4$ \NH, 176 g | ....do.... | Xylene, 550 g | 21–27 | 30 | 147 |
| 16b | 2a | 441 | $HOC_2H_4OC_2H_4OC_2H_4$ / $HOC_2H_4$ \NH, 192 g | ....do.... | Xylene, 400 g | 20–22 | 30 | 148 |
| 17b | 5a | 480 | $HOC_2H_4OC_2H_4OC_2H_4$ / $HOC_2H_4$ \NH, 192 g | ....do.... | ....do.... | 20–25 | 28 | 150 |
| 18b | 14a | 511 | $HOC_2H_4OC_2H_4OC_2H_4$ / $HOC_2H_4$ \NH, 192 g | ....do.... | Xylene, 500 g | 21–24 | 32 | 149 |
| 19b | 22a | 498 | $HOC_2H_4OC_2H_4OC_2H_4$ / $HOC_2H_4$ \NH, 192 g | ....do.... | Xylene, 450 g | 22–25 | 32 | 153 |
| 20b | 23a | 542 | $CH_3(OC_2H_4)_3$ / $HOC_2H_4$ \NH, 206 g | 30%, 100 g | Xylene, 500 g | 21–23 | 36 | 151 |
| 21b | 25a | 547 | $CH_3(OC_2H_4)_3$ / $HOC_2H_4$ \NH, 206 g | ....do.... | ....do.... | 25–30 | 34 | 148 |
| 22b | 2a | 441 | $CH_3(OC_2H_4)_3$ / $HOC_2H_4$ \NH, 206 g | ....do.... | Xylene, 400 g | 22–23 | 31 | 146 |
| 23b | 26a | 595 | Decylethanolamine, 201 g | 37%, 81 g | Xylene, 500 g | 22–27 | 24 | 145 |
| 24b | 27a | 391 | Decylethanolamine, 100 g | 30%, 50 g | Xylene, 300 g | 21–25 | 26 | 147 |

PART 5

The preparation of oxyalkylated derivatives of products of the kind which appear as examples in Part Four is carried out by procedures and in apparatus which are substantially conventional for oxyalkylation, and which will be illustrated by the following examples. In preparing the products of the examples, a conventional autoclave with required accessories for oxyalkylation having a capacity of about 25 gallons is used.

Example 1c

The oxyalkylation-susceptible compound employed is the one previously described and designated as Example 1b. Condensate 1b was in turn obtained from diethanolamine and the resin previously identified as Example 2a. Reference to Table I shows that this particular resin is obtained from para-tertiarybutylphenol and formaldehyde. 11.16 pounds of this resin condensate were dissolved in 7 pounds of solvent (xylene) along with one pound of finely powdered caustic soda as a catalyst. Adjustment was made in the autoclave to operate at a temperature of approximately 125° C. to 135° C., and at a pressure of about 15 to 20 pounds.

The time regulator was set so as to inject the ethylene oxide in approximately two hours and then continue stirring for a half-hour or longer. The reastion went readily and, as a matter of fact, the oxide was taken up almost immediately. Indeed the reaction was complete in less than an hour. More specifically it was complete in 45 minutes. The speed of reaction, particularly at the low pressure, undoubtedly was due in a large measure to excellent agitation and also to the comparatively high concentration of catalyst. The amount of ethylene oxide introduced was equal in weight to the initial condensation product, to wit, 11.16 pounds. This represented a molal ratio of 25 moles of ethylene oxide per mole of condensate.

The theoretical molecular weight at the end of the reaction period was 2232. A comparatively small sample, less than 50 grams, was withdrawn merely for examination as far as solubility or emulsifying power was concerned and also for the purpose of making some tests on various oil field emulsions. The amount withdrawn was so small that no cognizance of this fact is included in the data, or subsequent data, or in the data presented in tabular form in subsequent Tables III an IV.

The size of the autoclave employed was 25 gallons. In innumerable comparable oxyalkylations I have withdrawn a substantial portion at the end of each step and continued oxyalkylation on a partial residual sample. This was not the case in this particular series. Certain examples were duplicated as hereinafter noted and subjected to oxyalkylation with a different oxide.

Example 2c

This example simply illustrates the further oxyalkylation of Example 1c, preceding. As previously stated, the oxyalkylation-susceptible compound, to wit, Example 1b, present at the beginning of the stage was obviously the same as at the end of the prior stage (Example 1c), to wit, 11.16 pounds. The amount of oxide present in the initial step was 11.16 pounds, the amount of catalyst remained the same, to wit, one pound, and the amount of solvent remained the same. The amount of oxide added was another 11.16 pounds, all addition of oxide in these various stages being based on the addition of this particular amount. Thus, at the end of the oxyethylation step the amount of oxide added was a total of 22.32 pounds and the molal ratio of ethylene oxide to resin condensate was 50.8 to 1. The theoretical molecular weight was 3348.

The maximum temperature during the operation was 130° C. to 135° C. The maximum pressure was in the range of 15 to 20 pounds. The time period was one hour.

Example 3c

The oxyalkylation proceeded in the same manner described in Examples 1c and 2c. There was no added solvent and no added catalyst. The oxide added was 11.16 pounds and the total oxide at the end of the oxyethylation step was 33.48 pounds. The molal ratio of oxide to condensate was 76.2 to 1. Conditions as far as temperature and pressure and time were concerned were all the same as in Examples 1c and 2c. The time period was somewhat longer than in previous examples, to wit, 2 hours.

Example 4

The oxyethylation was continued and the amount of oxide added again was 11.16 pounds. There was no added catalyst and no added solvent. The theoretical molecular weight at the end of the reaction period was 5580. The molal ratio of oxide to condensate was 101.6 to 1. Conditions as far as temperature and pressure were concerned were the same as in previous examples. The time period was slightly longer, to wit, 3½ hours. The reaction unquestionably began to slow up somewhat.

Example 5c

The oxyethylation continued with the introduction of another 11.16 pounds of ethylene oxide. No more solvent was introduced but .3 pound caustic soda was added. The theoretical molecular weight at the end of the agitation period was 6696, and the molal ratio of oxide to resin condensate was 127 to 1. The time period, however, dropped to 1½ hours. Operating temperature and pressure remained the same as in the previous example.

Example 6c

The same procedure was followed as in the previous examples except that an added ¼ pound of powdered caustic soda was introduced to speed up the reaction. The amount of oxide added was another 11.16 pounds, bringing the total oxide introduced to 66.96 pounds. The temperature and pressure during this period were the same as before. There was no added catalyst and also no added solvent. The time period was 2½ hours.

Example 7c

The same procedure was followed as in the previous six examples without the addition of more caustic or more solvent. The total amount of oxide introduced at the end of the period was 78.12 pounds. The theoretical molecular weight at the end of the oxyalkylation period was 8928. The time required for the oxyethylation was a bit longer than in the previous step, to wit, 3 hours.

Example 8c

This was the final oxyethylation in this particular series. There was no added solvent and no added catalyst. The total amount of oxide added at the end of this step was 89.28 pounds. The theoretical molecular weight was 10,044. The molal ratio of oxide to resin condensate was 203.2 to one. Conditions as far as temperature and pressure were concerned were the same as in the previous examples and the time required for oxyethylation was 4 hours.

The same procedure as described in the previous examples is employed in connection with a number of the other condensates described previously. All these data have been presented in tabular form in a series of four tables, Tables III and IV, V and VI.

In substantially every case a 25-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Tables III and IV, it will be noted that compounds 1c through 40c were obtained by the use of ethylene oxide, whereas 41c through 80c were obtained by the use of propylene oxide alone.

Thus, in reference to Table III it is to be noted as follows.

The example number of each compound is indicated in the first column.

The identity of the oxyalkylation-susceptible compound, to wit, the resin condensate, is indicated in the second column.

The amount of condensate is shown in the third column.

Assuming that ethylene oxide alone is employed, as happens to be the case in Example 1c through 40c, the amount of oxide present in the oxyalkylation derivatives is shown in column 4, although in the initial step since no oxide is present there is a blank.

When ethylene oxide is used exclusively the 5th column is blank.

The 6th column shows the amount of powdered caustic soda used as a catalyst, and the 7th column shows the amount of solvent employed.

The 15th column shows the theoretical molecular weight at the end of the oxyalkylation period.

The 8th column states the amount of condensate present in the reaction mass at the end of the period.

As pointed out previously, in this particular series the amount of reaction mass withdrawn for examination was so small that it was ignored and for this reason the resin condensate in column 8 coincides with the figure in column 3.

Column 9 shows the amount of ethylene oxide employed in the reaction mass at the end of the particular period.

Table III

| Ex. No. | Composition before ||||||  Composition at end |||||  Molal ratio || Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| 1c | 1b | 11.16 | | | 1.0 | 7.0 | 11.16 | 11.16 | | 1.0 | 7.0 | 25.4 | | 2,232 |
| 2c | 1b | 11.16 | 11.16 | | 1.0 | 7.0 | 11.16 | 22.32 | | 1.0 | 7.0 | 50.8 | | 3,348 |
| 3c | 1b | 11.16 | 22.32 | | 1.0 | 7.0 | 11.16 | 33.48 | | 1.0 | 7.0 | 76.2 | | 4,464 |
| 4c | 1b | 11.16 | 33.48 | | 1.0 | 7.0 | 11.16 | 44.64 | | 1.0 | 7.0 | 101.6 | | 5,580 |
| 5c | 1b | 11.16 | 44.64 | | 1.3 | 7.0 | 11.16 | 55.80 | | 1.3 | 7.0 | 127.0 | | 6,696 |
| 6c | 1b | 11.16 | 55.80 | | 1.3 | 7.0 | 11.16 | 66.96 | | 1.3 | 7.0 | 152.4 | | 7,812 |
| 7c | 1b | 11.16 | 66.96 | | 1.3 | 7.0 | 11.16 | 78.12 | | 1.3 | 7.0 | 177.8 | | 8,928 |
| 8c | 1b | 11.16 | 78.12 | | 1.3 | 7.0 | 11.16 | 89.28 | | 1.3 | 7.0 | 203.2 | | 10,044 |
| 9c | 5b | 12.50 | | | 1.0 | 4.5 | 12.50 | 12.50 | | 1.0 | 4.5 | 28.4 | | 2,500 |
| 10c | 5b | 12.50 | 12.50 | | 1.0 | 4.5 | 12.50 | 25.00 | | 1.0 | 4.5 | 56.8 | | 3,750 |
| 11c | 5b | 12.50 | 25.0 | | 1.0 | 4.5 | 12.50 | 37.50 | | 1.0 | 4.5 | 84.2 | | 5,000 |
| 12c | 5b | 12.50 | 37.5 | | 1.0 | 4.5 | 12.50 | 50.00 | | 1.0 | 4.5 | 113.6 | | 6,250 |
| 13c | 5b | 12.50 | 50.0 | | 1.3 | 4.5 | 12.50 | 62.50 | | 1.3 | 4.5 | 140.0 | | 7,500 |
| 14c | 5b | 12.50 | 62.5 | | 1.3 | 4.5 | 12.50 | 75.00 | | 1.3 | 4.5 | 170.4 | | 8,750 |
| 15c | 5b | 12.50 | 75.0 | | 1.3 | 4.5 | 12.50 | 87.50 | | 1.3 | 4.5 | 196.8 | | 10,000 |
| 16c | 5b | 12.50 | 87.5 | | 1.3 | 4.5 | 12.50 | 100.00 | | 1.3 | 4.5 | 227.2 | | 11,250 |
| 17c | 7b | 10.84 | | | 1.0 | 7.0 | 10.84 | 10.84 | | 1.0 | 7.0 | 24.0 | | 2,168 |
| 18c | 7b | 10.84 | 10.84 | | 1.0 | 7.0 | 10.84 | 21.68 | | 1.0 | 7.0 | 49.4 | | 3,252 |
| 19c | 7b | 10.84 | 21.58 | | 1.0 | 7.0 | 10.84 | 32.52 | | 1.0 | 7.0 | 73.8 | | 4,336 |
| 20c | 7b | 10.84 | 32.52 | | 1.0 | 7.0 | 10.84 | 43.36 | | 1.0 | 7.0 | 98.5 | | 5,420 |
| 21c | 7b | 10.84 | 43.36 | | 1.3 | 7.0 | 10.84 | 54.20 | | 1.3 | 7.0 | 123.0 | | 6,504 |
| 22c | 7b | 10.84 | 54.20 | | 1.3 | 7.0 | 10.84 | 65.04 | | 1.3 | 7.0 | 148.0 | | 7,588 |
| 23c | 7b | 10.84 | 65.04 | | 1.3 | 7.0 | 10.84 | 75.88 | | 1.3 | 7.0 | 172.2 | | 8,672 |
| 24c | 7b | 10.84 | 75.88 | | 1.3 | 7.0 | 10.84 | 86.72 | | 1.3 | 7.0 | 196.8 | | 9,756 |
| 25c | 10b | 12.56 | | | 1.0 | 4.5 | 12.56 | 12.56 | | 1.0 | 4.5 | 28.6 | | 2,512 |
| 26c | 10b | 12.56 | 12.56 | | 1.0 | 4.5 | 12.56 | 25.12 | | 1.0 | 4.5 | 57.2 | | 3,768 |
| 27c | 10b | 12.56 | 25.12 | | 1.0 | 4.5 | 12.56 | 37.68 | | 1.0 | 4.5 | 85.8 | | 5,024 |
| 28c | 10b | 12.56 | 37.68 | | 1.0 | 4.5 | 12.56 | 50.24 | | 1.0 | 4.5 | 114.0 | | 6,280 |
| 29c | 10b | 12.56 | 50.24 | | 1.3 | 4.5 | 12.56 | 62.80 | | 1.3 | 4.5 | 142.8 | | 7,536 |
| 30c | 10b | 12.56 | 62.80 | | 1.3 | 4.5 | 12.56 | 75.36 | | 1.3 | 4.5 | 171.0 | | 8,792 |
| 31c | 10b | 12.56 | 75.36 | | 1.3 | 4.5 | 12.56 | 87.92 | | 1.3 | 4.5 | 199.8 | | 10,048 |
| 32c | 10b | 12.56 | 87.92 | | 1.3 | 4.5 | 12.56 | 100.48 | | 1.3 | 4.5 | 238.0 | | 11,304 |
| 33c | 1b | 11.16 | | | 1.0 | 7.0 | 11.16 | 5.58 | | 1.0 | 7.0 | 12.7 | | 1,674 |
| 34c | 1b | 11.16 | 5.58 | | 1.0 | 7.0 | 11.16 | 11.16 | | 1.0 | 7.0 | 25.4 | | 2,232 |
| 35c | 1b | 11.16 | 11.16 | | 1.0 | 7.0 | 11.16 | 16.74 | | 1.0 | 7.0 | 38.0 | | 2,790 |
| 36c | 1b | 11.16 | 16.74 | | 1.0 | 7.0 | 11.16 | 22.32 | | 1.0 | 7.0 | 50.7 | | 3,348 |
| 37c | 1b | 11.16 | 22.32 | | 1.3 | 7.0 | 11.16 | 27.90 | | 1.3 | 7.0 | 63.5 | | 3,906 |
| 38c | 1b | 11.16 | 27.90 | | 1.3 | 7.0 | 11.16 | 33.48 | | 1.3 | 7.0 | 76.2 | | 4,464 |
| 39c | 1b | 11.16 | 33.48 | | 1.3 | 7.0 | 11.16 | 39.06 | | 1.3 | 7.0 | 89.0 | | 5,022 |
| 40c | 1b | 11.16 | 39.06 | | 1.3 | 7.0 | 11.16 | 44.64 | | 1.3 | 7.0 | 101.2 | | 5,580 |

*Oxyalkylation-susceptible.

Column 10 can be ignored insofar that no propylene oxide was employed.

Column 11 shows the catalyst at the end of the reaction period.

Column 12 shows the amount of solvent at the end of the reaction period.

Column 13 shows the molal ratio of ethylene oxide to condensate.

Column 14 can be ignored for the reason that no propylene oxide was employed.

Referring now to Table VI. It is to be noted that the first column refers to Examples 1c, 2c, 3c, etc.

The second column gives the maximum temperature employed during the oxyalkylation step and the third column gives the maximum pressure.

The fourth column gives the time period employed.

The last three columns show solubility tests by shaking a small amount of the compound, including the solvent present, with several volumes of water, xylene and kerosene. It sometimes happens that although xylene in comparatively small amounts will dissolve in the concentrated material, when the concentrated material in turn is diluted with xylene separation takes place.

Referring to Table IV, Examples 41c through 80c are the counterparts of Examples 1c through 40c, except that the oxide employed is propylene oxide instead of ethylene oxide. Therefore, as explained previously, two columns are blank, to wit, columns 4 and 9.

Reference is now made to Table V. It is to be noted these compounds are designated by "d" numbers, 1d, 2d, 3d, etc., through and including 32d. They are derived, in turn, from compounds in the "c" series, for example, 35c, 39c, 53c, and 62c. These compounds involve the use of both ethylene oxide and propylene oxide. Since compounds 1c through 40c were obtained by the use of ethylene oxide, it is obvious that those obtained from 35c and 39c, involve the use of ethylene oxide first, and propylene oxide afterward. Inversely, those compounds obtained from 53c and 62c obviously came from a prior series in which propylene oxide was used first.

In the preparation of this series indicated by the small letter "d," as 1d, 2d, 3d, etc., the initial "c" series such as 35c, 39c, 53, and 62c, were duplicated and the oxyalkylation stopped at the point designated instead of being carried further as may have been the case in the original oxyalkylation step. Then oxyalkylation proceeded by using the second oxide as indicated by the previous explanation, to wit, propylene oxide in 1d through 16d, and ethylene oxide in 17d through 32d, inclusive.

In examining the table beginning with 1d, it will be noted that the initial product, i. e., 35c, consisted of the reaction product involving 11.16 pounds of the resin condensate, 16.74 pounds of ethylene oxide, 1.0 pounds of caustic soda, and 7.0 pounds of the solvent.

It is to be noted that reference to the catalyst in Table V refers to the total amount of catalyst, i. e., the catalyst present from the first oxyalkylation step plus added catalyst, if any. The same is true in regard to the solvent. Reference to the solvent refers to the total solvent present, i. e., that from the first oxyalkylation step plus added solvent, if any.

In this series, it will be noted that the theoretical molecular weights are given prior to the oxyalkylation step and after the oxyalkylation step, although the value at the end of one step is the value at the beginning of the next step, except obviously at the very start the value depends on the theoretical molecular weight at the end of the initial oxyalkylation step; i. e., oxyethylation for 1d through 16d, and oxypropylation for 17d through 32d.

It will be noted also that under the molal ratio the values of both oxides to the resin condensate are included.

The data given in regard to the operating conditions is substantially the same as before and appears in Table VI.

The products resulting from these procedures may contain modest amounts, or have small amounts, of the solvents as indicated by the figures in the tables. If desired the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned, or a combination of both of them.

The colors of the products usually vary from a reddish amber tint to a definitely red, and amber. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the product. Products can be prepared in which the final color is a lighter amber with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen atom, the removal of the alkaline catalyst is somewhat more difficult than ordinarily is the case for the reason that if one adds hydrochloric acid, for example, to neutralize the alkalinity one may partially neutralize the basic nitrogen radical also. The preferred procedure is to ignore the presence of the alkali unless it is objectionable or else add a stoichiometric amount of concentrated hydrochloric acid equal to the caustic soda present.

Table IV

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Sol. vent, lbs. | Ethyl. oxide to oxyalkyl. suscept. cmpd. | Propl. oxide to oxyalkyl. suscept. cmpd. | |
| 41c | 1b | 11.16 | | | 1.1 | 7.0 | 11.16 | | 11.16 | 1.1 | 7.0 | | 19.3 | 2,232 |
| 42c | 1b | 11.16 | | 11.16 | 1.1 | 7.0 | 11.16 | | 22.32 | 1.1 | 7.0 | | 38.6 | 3,348 |
| 43c | 1b | 11.16 | | 22.32 | 1.1 | 7.0 | 11.16 | | 33.48 | 1.1 | 7.0 | | 57.8 | 4,464 |
| 44c | 1b | 11.16 | | 33.48 | 1.1 | 7.0 | 11.16 | | 44.64 | 1.1 | 7.0 | | 77.0 | 5,580 |
| 45c | 1b | 11.16 | | 44.64 | 1.1 | 7.0 | 11.16 | | 55.80 | 1.1 | 7.0 | | 96.5 | 7,812 |
| 46c | 1b | 11.16 | | 55.80 | 1.4 | 7.0 | 11.16 | | 78.12 | 1.4 | 7.0 | | 117.8 | 10,044 |
| 47c | 1b | 11.16 | | 78.12 | 1.4 | 7.0 | 11.16 | | 100.44 | 1.4 | 7.0 | | 180.5 | 12,276 |
| 48c | 1b | 11.16 | | 100.44 | 1.4 | 7.0 | 11.16 | | 122.76 | 1.4 | 7.0 | | 220.0 | 13,392 |
| 49c | 5b | 12.50 | | | 1.1 | 4.5 | 12.50 | | 12.50 | 1.1 | 4.5 | | 21.6 | 2,500 |
| 50c | 5b | 12.50 | | 12.5 | 1.1 | 4.5 | 12.50 | | 25.00 | 1.1 | 4.5 | | 43.2 | 3,750 |
| 51c | 5b | 12.50 | | 25.0 | 1.1 | 4.5 | 12.50 | | 37.50 | 1.1 | 4.5 | | 64.8 | 5,000 |
| 52c | 5b | 12.50 | | 37.5 | 1.1 | 4.5 | 12.50 | | 50.00 | 1.1 | 4.5 | | 86.4 | 6,250 |
| 53c | 5b | 12.50 | | 50.0 | 1.1 | 4.5 | 12.50 | | 62.50 | 1.1 | 4.5 | | 108.0 | 8,750 |
| 54c | 5b | 12.50 | | 62.5 | 1.5 | 4.5 | 12.50 | | 87.50 | 1.5 | 4.5 | | 151.2 | 11,250 |
| 55c | 5b | 12.50 | | 87.5 | 1.5 | 4.5 | 12.50 | | 112.50 | 1.5 | 4.5 | | 194.4 | 13,750 |
| 56c | 5b | 12.50 | | 112.5 | 1.5 | 4.5 | 12.50 | | 137.50 | 1.5 | 4.5 | | 237.6 | 15,000 |
| 57c | 7b | 10.84 | | | 1.1 | 7.0 | 10.84 | | 10.84 | 1.1 | 7.0 | | 18.7 | 2,168 |
| 58c | 7b | 10.84 | | 10.84 | 1.1 | 7.0 | 10.84 | | 21.68 | 1.1 | 7.0 | | 37.4 | 3,252 |
| 59c | 7b | 10.84 | | 21.68 | 1.1 | 7.0 | 10.84 | | 32.52 | 1.1 | 7.0 | | 56.1 | 4,336 |
| 60c | 7b | 10.84 | | 32.52 | 1.1 | 7.0 | 10.84 | | 43.36 | 1.1 | 7.0 | | 74.8 | 5,420 |
| 61c | 7b | 10.84 | | 43.36 | 1.1 | 7.0 | 10.84 | | 54.20 | 1.1 | 7.0 | | 93.5 | 7,588 |
| 62c | 7b | 10.84 | | 54.20 | 1.5 | 7.0 | 10.84 | | 75.88 | 1.5 | 7.0 | | 130.9 | 9,756 |
| 63c | 7b | 10.84 | | 75.88 | 1.5 | 7.0 | 10.84 | | 97.56 | 1.5 | 7.0 | | 168.3 | 11,924 |
| 64c | 7b | 10.84 | | 97.56 | 1.5 | 7.0 | 10.84 | | 119.24 | 1.5 | 7.0 | | 205.7 | 13,008 |
| 65c | 10b | 12.56 | | | 1.2 | 4.5 | 12.56 | | 12.56 | 1.2 | 4.5 | | 21.7 | 2,512 |
| 66c | 10b | 12.56 | | 12.56 | 1.2 | 4.5 | 12.56 | | 25.12 | 1.2 | 4.5 | | 43.4 | 3,768 |
| 67c | 10b | 12.56 | | 25.12 | 1.2 | 4.5 | 12.56 | | 37.68 | 1.2 | 4.5 | | 65.1 | 5,024 |
| 68c | 10b | 12.56 | | 37.68 | 1.2 | 4.5 | 12.56 | | 50.24 | 1.2 | 4.5 | | 86.8 | 6,280 |
| 69c | 10b | 12.56 | | 50.24 | 1.2 | 4.5 | 12.56 | | 62.80 | 1.2 | 4.5 | | 108.4 | 8,792 |
| 70c | 10b | 12.56 | | 52.80 | 1.5 | 4.5 | 12.56 | | 87.92 | 1.5 | 4.5 | | 151.9 | 11,304 |
| 71c | 10b | 12.56 | | 87.92 | 1.5 | 4.5 | 12.56 | | 113.04 | 1.5 | 4.5 | | 195.3 | 13,816 |
| 72c | 10b | 12.56 | | 113.04 | 1.5 | 4.5 | 12.56 | | 138.16 | 1.5 | 4.5 | | 238.7 | 15,072 |
| 73c | 1b | 11.16 | | | 1.1 | 7.0 | 11.16 | | 5.58 | 1.1 | 7.0 | | 9.6 | 1,674 |
| 74c | 1b | 11.16 | | 5.58 | 1.1 | 7.0 | 11.16 | | 11.16 | 1.1 | 7.0 | | 19.2 | 2,232 |
| 75c | 1b | 11.16 | | 11.16 | 1.1 | 7.0 | 11.16 | | 16.74 | 1.1 | 7.0 | | 28.8 | 2,790 |
| 76c | 1b | 11.16 | | 16.74 | 1.1 | 7.0 | 11.16 | | 22.32 | 1.1 | 7.0 | | 38.4 | 3,348 |
| 77c | 1b | 11.16 | | 22.32 | 1.1 | 7.0 | 11.16 | | 27.90 | 1.1 | 7.0 | | 48.0 | 3,906 |
| 78c | 1b | 11.16 | | 27.90 | 1.4 | 7.0 | 11.16 | | 39.06 | 1.4 | 7.0 | | 76.2 | 5,022 |
| 79c | 1b | 11.16 | | 39.06 | 1.4 | 7.0 | 11.16 | | 50.22 | 1.4 | 7.0 | | 86.4 | 6,138 |
| 80c | 1b | 11.16 | | 50.22 | 1.4 | 7.0 | 11.16 | | 61.38 | 1.4 | 7.0 | | 105.6 | 7,254 |

*Oxyalkylation-susceptible.

Table V

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| 1d | 35c | 11.16 | 16.74 | -------- | 1.0 | 7.0 | 11.16 | 16.74 | 5.58 | 1.0 | 7.0 | 38.0 | 9.63 | 3,348 |
| 2d | 35c | 11.16 | 16.74 | 5.58 | 1.0 | 7.0 | 11.16 | 16.74 | 11.16 | 1.0 | 7.0 | 38.0 | 19.26 | 3,906 |
| 3d | 35c | 11.16 | 16.74 | 11.16 | 1.0 | 7.0 | 11.16 | 16.74 | 16.74 | 1.0 | 7.0 | 38.0 | 28.9 | 4,464 |
| 4d | 35c | 11.16 | 16.74 | 16.74 | 1.0 | 7.0 | 11.16 | 16.74 | 22.32 | 1.0 | 7.0 | 38.0 | 38.5 | 5,022 |
| 5d | 35c | 11.16 | 16.74 | 23.32 | 1.0 | 7.0 | 11.16 | 16.74 | 27.90 | 1.0 | 7.0 | 38.0 | 48.15 | 5,580 |
| 6d | 35c | 11.16 | 16.74 | 27.90 | 1.0 | 7.0 | 11.16 | 16.74 | 33.48 | 1.5 | 7.0 | 38.0 | 57.75 | 6,138 |
| 7d | 35c | 11.16 | 16.74 | 33.48 | 1.5 | 7.0 | 11.16 | 16.74 | 39.06 | 1.5 | 7.0 | 38.0 | 67.4 | 6,696 |
| 8d | 35c | 11.16 | 16.74 | 39.06 | 1.5 | 7.0 | 11.16 | 16.74 | 44.64 | 1.5 | 7.0 | 38.0 | 77.0 | 7,253 |
| 9d | 39c | 11.16 | 39.06 | -------- | 1.3 | 7.0 | 11.16 | 39.06 | 5.58 | 1.3 | 7.0 | 89.0 | 9.6 | 5,022 |
| 10d | 39c | 11.16 | 39.06 | 5.58 | 1.3 | 7.0 | 11.16 | 39.06 | 11.16 | 1.3 | 7.0 | 89.0 | 19.2 | 5,580 |
| 11d | 39c | 11.16 | 39.06 | 11.16 | 1.3 | 7.0 | 11.16 | 39.06 | 16.74 | 1.3 | 7.0 | 89.0 | 28.8 | 6,138 |
| 12d | 39c | 11.16 | 39.06 | 16.74 | 1.3 | 7.0 | 11.16 | 39.06 | 22.32 | 1.3 | 7.0 | 89.0 | 38.4 | 6,696 |
| 13d | 39c | 11.16 | 39.06 | 22.32 | 1.3 | 7.0 | 11.16 | 39.06 | 27.90 | 1.8 | 7.0 | 89.0 | 48.1 | 7,254 |
| 14d | 39c | 11.16 | 39.06 | 27.90 | 1.8 | 7.0 | 11.16 | 39.06 | 19.06 | 1.8 | 7.0 | 89.0 | 67.3 | 8,370 |
| 15d | 39c | 11.16 | 39.06 | 39.06 | 1.8 | 7.0 | 11.16 | 39.06 | 50.22 | 1.8 | 7.0 | 89.0 | 86.5 | 9,486 |
| 16d | 39c | 11.16 | 39.06 | 50.22 | 1.8 | 7.0 | 11.16 | 39.06 | 61.38 | 1.8 | 7.0 | 89.0 | 105.7 | 10,602 |
| 17d | 53c | 12.5 | -------- | 62.5 | 1.1 | 4.5 | 12.5 | 6.25 | 62.5 | 1.1 | 4.5 | 14.2 | 108 | 9,375 |
| 18d | 53c | 12.5 | 6.25 | 62.5 | 1.1 | 4.5 | 12.5 | 12.50 | 62.5 | 1.1 | 4.5 | 28.4 | 108 | 10,000 |
| 19d | 53c | 12.5 | 12.50 | 26.5 | 1.1 | 4.5 | 12.5 | 18.75 | 62.5 | 1.1 | 4.5 | 42.6 | 108 | 10,625 |
| 20d | 53c | 12.5 | 18.75 | 62.5 | 1.1 | 4.5 | 12.5 | 31.25 | 62.5 | 1.6 | 4.5 | 71.0 | 108 | 11,875 |
| 21d | 53c | 12.5 | 31.25 | 62.5 | 1.1 | 4.5 | 12.5 | 37.50 | 62.5 | 1.6 | 4.5 | 85.2 | 108 | 12,500 |
| 22d | 53c | 12.5 | 37.50 | 62.5 | 1.1 | 4.5 | 12.5 | 43.75 | 62.5 | 1.6 | 4.5 | 99.5 | 108 | 13,125 |
| 23d | 53c | 12.5 | 43.75 | 62.5 | 1.1 | 4.5 | 12.5 | 50.00 | 62.5 | 1.6 | 4.5 | 113.5 | 108 | 13,750 |
| 24d | 53c | 12.5 | 50.00 | 62.5 | 1.1 | 4.5 | 12.5 | 62.50 | 62.5 | 1.6 | 4.5 | 142.0 | 108 | 15,000 |
| 25d | 62c | 10.84 | -------- | 75.88 | 1.5 | 7.0 | 10.84 | 5.42 | 75.88 | 1.5 | 7.0 | 12.31 | 130.9 | 10,298 |
| 26d | 62c | 10.84 | 5.42 | 75.88 | 1.5 | 7.0 | 10.84 | 10.84 | 75.88 | 1.5 | 7.0 | 24.62 | 130.9 | 10,840 |
| 27d | 62c | 10.84 | 10.84 | 75.88 | 1.5 | 7.0 | 10.84 | 16.26 | 75.88 | 1.5 | 7.0 | 36.90 | 130.9 | 11,382 |
| 28d | 62c | 10.84 | 16.26 | 75.88 | 1.5 | 7.0 | 10.84 | 21.68 | 75.88 | 1.5 | 7.0 | 49.3 | 130.9 | 11,924 |
| 29d | 62c | 10.84 | 23.28 | 75.88 | 1.5 | 7.0 | 10.84 | 27.10 | 75.88 | 1.5 | 7.0 | 61.6 | 130.9 | 12,466 |
| 30d | 62c | 10.84 | 27.10 | 75.88 | 1.5 | 7.0 | 10.84 | 32.52 | 75.88 | 2.0 | 7.0 | 73.8 | 130.9 | 13,008 |
| 31d | 62c | 10.84 | 32.52 | 75.88 | 2.0 | 7.0 | 10.84 | 43.36 | 75.88 | 2.0 | 7.0 | 98.5 | 130.9 | 14,092 |
| 32d | 62c | 10.84 | 43.36 | 75.88 | 2.0 | 7.0 | 10.84 | 54.20 | 75.88 | 2.0 | 7.0 | 123.1 | 130.9 | 15,176 |

*Oxyalkylation-susceptible.

Table VI

| Ex. No. | Max. temp., °C. | Max. pres., p.s.i. | Time, hrs. | Solubility | | |
|---|---|---|---|---|---|---|
| | | | | Water | Xylene | Kerosene |
| 1c | 125-135 | 15-20 | ¾ | Insoluble | | |
| 2c | 125-135 | 15-20 | 1 | Emulsifiable | | |
| 3c | 125-135 | 15-20 | 2 | Soluble | | |
| 4c | 125-135 | 15-20 | 3½ | ---do--- | | |
| 5c | 125-135 | 15-20 | 1½ | ---do--- | | |
| 6c | 125-135 | 15-20 | 2½ | ---do--- | | |
| 7c | 125-135 | 15-20 | 3 | ---do--- | | |
| 8c | 125-135 | 15-20 | 4 | ---do--- | | |
| 9c | 125-130 | 15-20 | 1 | Insoluble | | |
| 10c | 125-130 | 15-20 | 1¼ | Emulsifiable | | |
| 11c | 125-130 | 15-20 | 1¾ | Soluble | | |
| 12c | 125-130 | 15-20 | 3 | ---do--- | | |
| 13c | 125-130 | 15-20 | 2½ | ---do--- | | |
| 14c | 125-130 | 15-20 | 3 | ---do--- | | |
| 15c | 125-130 | 15-20 | 4 | ---do--- | | |
| 16c | 125-130 | 15-20 | 5 | ---do--- | | |
| 17c | 125-130 | 10-15 | ¾ | Insoluble | | |
| 18c | 125-130 | 10-15 | ¾ | Emulsifiable | | |
| 19c | 125-130 | 10-15 | 1½ | Soluble | | |
| 20c | 125-130 | 10-15 | 2½ | ---do--- | | |
| 21c | 125-130 | 10-15 | 2 | ---do--- | | |
| 22c | 125-130 | 10-15 | 2½ | ---do--- | | |
| 23c | 125-130 | 10-15 | 3 | ---do--- | | |
| 24c | 125-130 | 10-15 | 4 | ---do--- | | |
| 25c | 130-135 | 15-20 | 1¼ | Insoluble | | |
| 26c | 130-135 | 15-20 | 2 | Emulsifiable | | |
| 27c | 130-135 | 15-20 | 2½ | Soluble | | |
| 28c | 130-135 | 15-20 | 3¼ | ---do--- | | |
| 29c | 130-135 | 15-20 | 3 | ---do--- | | |
| 30c | 130-135 | 15-20 | 3½ | ---do--- | | |
| 31c | 130-135 | 15-20 | 4 | ---do--- | | |
| 32c | 130-135 | 15-20 | 6 | ---do--- | | |
| 33c | 125-130 | 15-20 | 1 | Insoluble | | |
| 34c | 125-130 | 15-20 | 1¼ | Emulsifiable | | |
| 35c | 125-130 | 15-20 | 2 | Soluble | | |
| 36c | 125-130 | 15-20 | 3½ | ---do--- | | |
| 37c | 125-130 | 15-20 | 3½ | ---do--- | | |
| 38c | 125-130 | 15-20 | 4 | ---do--- | | |
| 39c | 125-130 | 15-20 | 5 | ---do--- | | |
| 40c | 125-130 | 15-20 | 6 | ---do--- | | |
| 41c | 125-130 | 15-20 | 1½ | Insoluble | Soluble | Insoluble. |
| 42c | 125-130 | 15-20 | 1½ | ---do--- | ---do--- | Dispersible. |
| 43c | 125-130 | 15-20 | 2 | ---do--- | ---do--- | Soluble. |
| 44c | 125-130 | 15-20 | 3 | ---do--- | ---do--- | Do. |
| 45c | 125-130 | 15-20 | 4 | ---do--- | ---do--- | Do. |
| 46c | 125-130 | 15-20 | 3 | ---do--- | ---do--- | Do. |
| 47c | 125-130 | 15-20 | 4 | ---do--- | ---do--- | Do. |
| 48c | 125-130 | 15-20 | 5 | ---do--- | ---do--- | Do. |

Table VI—Continued

| Ex. No. | Max. temp., °C. | Max. pres., p.s.i. | Time, hrs. | Solubility | | |
|---|---|---|---|---|---|---|
| | | | | Water | Xylene | Kerosene |
| 49c | 125-130 | 25-35 | ¾ | Insoluble | Soluble | Insoluble. |
| 50c | 125-130 | 25-35 | 1¼ | ....do | ....do | Dispersible. |
| 51c | 125-130 | 25-35 | 2 | ....do | ....do | Do. |
| 52c | 125-130 | 25-35 | 3 | ....do | ....do | Do. |
| 53c | 125-130 | 25-35 | 4 | ....do | ....do | Soluble. |
| 54c | 125-130 | 25-35 | 3½ | ....do | ....do | Do. |
| 55c | 125-130 | 25-35 | 4 | ....do | ....do | Do. |
| 56c | 125-130 | 25-35 | 5 | ....do | ....do | Do. |
| 57c | 130-135 | 5-10 | 2 | ....do | ....do | Insoluble. |
| 58c | 130-135 | 5-10 | 2½ | ....do | ....do | Dispersible. |
| 59c | 130-135 | 5-10 | 2½ | ....do | ....do | Do. |
| 60c | 130-135 | 5-10 | 3 | ....do | ....do | Soluble. |
| 61c | 130-135 | 5-10 | 4 | ....do | ....do | Do. |
| 62c | 130-135 | 5-10 | 4 | ....do | ....do | Do. |
| 63c | 130-135 | 5-10 | 4½ | ....do | ....do | Do. |
| 64c | 130-135 | 5-10 | 5 | ....do | ....do | Do. |
| 65c | 125-135 | 15-20 | ¼ | ....do | ....do | Insoluble. |
| 66c | 125-135 | 15-20 | ½ | ....do | ....do | Do. |
| 67c | 125-135 | 15-20 | 1 | ....do | ....do | Dispersible. |
| 68c | 125-135 | 15-20 | 2 | ....do | ....do | Soluble. |
| 69c | 125-135 | 15-20 | 3 | ....do | ....do | Do. |
| 70c | 125-135 | 15-20 | 2½ | ....do | ....do | Do. |
| 71c | 125-135 | 15-20 | 3 | ....do | ....do | Do. |
| 72c | 125-135 | 15-20 | 4 | ....do | ....do | Do. |
| 73c | 125-130 | 15-20 | ½ | ....do | ....do | Insoluble. |
| 74c | 125-130 | 15-20 | ¾ | ....do | ....do | Do. |
| 75c | 125-130 | 15-20 | 1 | ....do | ....do | Do. |
| 76c | 125-130 | 15-20 | 2 | ....do | ....do | Dispersible. |
| 77c | 125-130 | 15-20 | 3 | ....do | ....do | Soluble. |
| 78c | 125-130 | 15-20 | 3 | ....do | ....do | Do. |
| 79c | 125-130 | 15-20 | 3½ | ....do | ....do | Do. |
| 80c | 125-130 | 15-20 | 4 | ....do | ....do | Do. |
| 1d | 125-130 | 15-20 | ½ | Soluble | ....do | Insoluble. |
| 2d | 125-130 | 15-20 | ¾ | Emulsifiable | ....do | Do. |
| 3d | 125-130 | 15-20 | 1 | ....do | ....do | Do. |
| 4d | 125-130 | 15-20 | 2 | ....do | ....do | Do. |
| 5d | 125-130 | 15-20 | 3 | ....do | ....do | Do. |
| 6d | 125-130 | 15-20 | 3 | Insoluble | ....do | Do. |
| 7d | 125-130 | 15-20 | 3½ | ....do | ....do | Dispersible. |
| 8d | 125-130 | 15-20 | 4 | ....do | ....do | Soluble. |
| 9d | 125-130 | 15-20 | ½ | Soluble | Insoluble | Insoluble. |
| 10d | 125-130 | 15-20 | ¾ | ....do | ....do | Do. |
| 11d | 125-130 | 15-20 | 1½ | ....do | ....do | Do. |
| 12d | 125-130 | 15-20 | 2¾ | ....do | Soluble | Do. |
| 13d | 125-130 | 15-20 | 1½ | ....do | ....do | Do. |
| 14d | 125-130 | 15-20 | 2½ | Emulsifiable | ....do | Do. |
| 15d | 125-130 | 15-20 | 3 | ....do | ....do | Dispersible. |
| 16d | 125-130 | 15-20 | 3½ | Insoluble | ....do | Soluble. |
| 17d | 125-130 | 25-30 | ¾ | ....do | ....do | Do. |
| 18d | 125-130 | 25-30 | 1½ | ....do | ....do | Do. |
| 19d | 125-130 | 25-30 | 3 | ....do | ....do | Do. |
| 20d | 125-130 | 25-30 | 2½ | Emulsifiable | ....do | Dispersible. |
| 21d | 125-130 | 25-30 | 3 | ....do | ....do | Insoluble. |
| 22d | 125-130 | 25-30 | 3 | Soluble | ....do | Do. |
| 23d | 125-130 | 25-30 | 4 | ....do | ....do | Do. |
| 24d | 125-130 | 25-30 | 4¼ | ....do | ....do | Do. |
| 25d | 130-135 | 5-10 | ½ | Insoluble | ....do | Soluble. |
| 26d | 130-135 | 5-10 | 1 | ....do | ....do | Do. |
| 27d | 130-135 | 5-10 | 1½ | Emulsifiable | ....do | Do. |
| 28d | 130-135 | 5-10 | 2½ | ....do | ....do | Do. |
| 29d | 130-135 | 5-10 | 3½ | ....do | ....do | Dispersible. |
| 30d | 130-135 | 5-10 | 3 | Soluble | ....do | Insoluble. |
| 31d | 130-135 | 5-10 | 3¾ | ....do | ....do | Do. |
| 32d | 130-135 | 5-10 | 2¾ | ....do | ....do | Do. |

PART 6

The resin condensates which are employed as intermediate reactants are strongly basic. Initial oxyalkylation of these products with a monoepoxide or diepoxide can be accomplished generally, at least in the initial stage, without the addition of the usual alkaline catalyst such as those described in connection with oxyalkylation employing monoepoxides in Part 5 immediately preceding. As a matter of fact, the procedure is substantially the same as using a non-volatile monoepoxide such as glycide or methylglycide. However, during progressive oxyalkylation with a monoepoxide it is usually necessary to use a catalyst as previously described and, thus, there may or may not be sufficient catalyst present for the reaction with the diepoxide. Reference to the catalyst present includes the residual catalyst remaining from the oxyalkylation step in which the monoepoxide was used.

Briefly stated then, employing polyepoxides in combination with a non-basic reactant the usual catalysts include alkaline materials, such as caustic soda, caustic potash, sodium methylate, etc. Other catalysts may be acidic in nature and are of the kind illustrated by iron and tin chloride. Furthermore, insoluble catalysts such as clay or specially prepared mineral catalysts have been used. If for any reason the reaction does not proceed rapidly enough with the diglycidyl ether or other analogous reactant then a small amount of finely divided caustic soda or sodium methylate can be employed as a catalyst. The amount generally employed would be 1% or 2%.

It goes without saying that the reaction can take place in an inert solvent, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethyleneglycol, or the diethylether of propyleneglycol, or similar ethers, either alone or in combination with a hydrocarbon solvent. The selection of the solvent depends in part on the subsequent use of the derivatives or reaction products. If the reaction products are to be rendered solvent-free and it is necessary that the solvent be readily removed as, for example, by the use of vacuum distillation, then xylene or an aromatic petroleum solvent will serve. If the product is going to be subjected to oxyalkylation subsequently, then the solvent should be one which is not oxyalkylation-susceptible. It is easy

27 enough to select a suitable solvent if required in any instance but, everything else being equal, the solvent chosen should be the most economical one.

Example 1c

The product was obtained by reaction between diepoxide A and oxyalkylated resin condensate 1c which has been described in preceding Part 5 and was obtained by the oxyalkylation of condensate 1b. The preparation of condensate 1b was described in Part 4, preceding. Details have been included in regard to both steps. Condensate 1b, in turn, was obtained from diethanolamine and resin 2a; resin 2a, in turn was obtained from para-tertiarybutylphenol and formaldehyde.

In any event, 223 grams of the oxyalkylated resin condensate previously identified as 1c were dissolved in approximately an equal weight of xylene. About 2.25 grams of sodium methylate were added as a catalyst so the total amount of catalyst present, including residual catalyst from the prior oxyalkylation, was about 2.4 grams. 18.5 grams of diepoxide A were mixed with an equal weight of xylene. The initial addition of the diepoxide solution was made after raising the temperature of the reaction mass to about 105° C. The diepoxide was added slowly over a period of about one hour. During this time the temperature was allowed to rise to about 125° C. The mixture was allowed to reflux at about 135–140° C. using a phase-separating trap. A small amount of xylene was removed by means of a phase-separating trap so the refluxing temperature rose gradually to about 155° C. The mixture was refluxed at this temperature for about 3½ hours. At the end of this period the xylene which had been removed by means of the phase-separating trap was returned to the mixture. A small amount of material was withdrawn and the xylene evaporated on a hot plate in order to examine the physical properties. The material was an amber, or light reddish amber, viscous liquid. It was insoluble in water; it was insoluble in gluconic acid, but it was soluble in xylene and particularly in a mixture of 80% xylene and 20% methanol. However, if the material was dissolved in an oxygenated solvent and then shaken with 5% gluconic acid it showed a definite tendency to disperse, suspend, or form a sol, and particularly in a xylene-methanol mixed solvent as previously described, with or without the further addition of a little acetone.

Generally speaking, the solubility of these derivatives is in line with expectations by merely examining the solubility of the preceding intermediates, to wit, the oxyalkylated resin condensates prior to treatment with the diepoxide. These materials, of course, vary from extremely water-soluble products due to substantial oxyethylation, to those which conversely are water-insoluble but xylene-soluble or even kerosene-soluble due to high stage oxypropylation. Reactions with diepoxides or polyepoxides of the kind herein described reduce the hydrophile properties and increase the hydrophobe properties, i. e., generally make the products more soluble in kerosene or a mixture of kerosene and xylene, or in xylene, but less soluble in water. Since this is a general rule which applies throughout, for sake of brevity future reference to solubility will be omitted.

The procedure employed, of course, is simple in light of what has been said previously and in effect is a procedure similar to that employed in the use of glycide or methylglycide as oxyalkylating agents. See, for example, Part One of U. S. Patent No. 2,602,062 dated July 1, 1952, to De Groote.

Various examples obtained in substantially the same manner are enumerated in the following tables:

Table VII

| Ex. No. | Oxy. resin condensate | Amt., grs. | Diepoxide used | Amt., grs. | Catalyst (NaOCH₃), grs. | Xylene, grs. | Molar ratio | Time of reaction, hrs. | Max. temp., °C. | Color and physical state |
|---|---|---|---|---|---|---|---|---|---|---|
| 1e | 1c | 223 | A | 18.5 | 2.4 | 242 | 2:1 | 3.5 | 155 | Reddish amber resinous mass. |
| 2e | 10c | 375 | A | 18.5 | 3.9 | 394 | 2:1 | 3.5 | 152 | Do. |
| 3e | 20c | 271 | A | 9.3 | 2.8 | 280 | 2:1 | 3.5 | 148 | Do. |
| 4e | 29c | 377 | A | 9.3 | 3.9 | 386 | 2:1 | 3.5 | 150 | Do. |
| 5e | 32c | 113 | A | 1.9 | 1.1 | 115 | 2:1 | 3.4 | 160 | Do. |
| 6e | 49c | 335 | A | 18.5 | 3.5 | 354 | 2:1 | 3 | 154 | Do. |
| 7e | 50c | 375 | A | 18.5 | 3.9 | 394 | 2:1 | 4 | 155 | Do. |
| 8e | 60c | 271 | A | 9.3 | 2.8 | 280 | 2:1 | 4 | 165 | Do. |
| 9e | 68c | 314 | A | 9.3 | 3.2 | 323 | 2:1 | 4 | 145 | Do. |
| 10e | 80c | 363 | A | 9.3 | 3.7 | 372 | 2:1 | 4 | 165 | Do. |
| 11e | 2d | 391 | A | 18.5 | 4.1 | 409 | 2:1 | 4 | 160 | Do. |
| 12e | 10d | 279 | A | 9.3 | 2.9 | 288 | 2:1 | 4 | 164 | Do. |
| 13e | 13d | 363 | A | 9.3 | 3.7 | 372 | 2:1 | 4 | 150 | Do. |
| 14e | 18d | 100 | A | 1.9 | 1.0 | 102 | 2:1 | 3.5 | 155 | Do. |
| 15e | 32d | 152 | A | 1.9 | 1.5 | 154 | 2:1 | 4 | 165 | Do. |

Table VIII

| Ex. No. | Oxy. resin condensate | Amt., grs. | Diepoxide used | Amt., grs. | Catalyst (NaOCH₃), grs. | Xylene, grs. | Molar ratio | Time of reaction, hrs. | Max. temp., °C. | Color and physical state |
|---|---|---|---|---|---|---|---|---|---|---|
| 1f | 1c | 223 | B | 11 | 2.3 | 234 | 2:1 | 4 |  | Reddish amber resinous mass. |
| 2f | 10c | 375 | B | 11 | 3.9 | 386 | 2:1 | 4 | 155 | Do. |
| 3f | 20c | 271 | B | 5.5 | 2.8 | 277 | 2:1 | 4 | 152 | Do. |
| 4f | 29c | 377 | B | 5.5 | 3.8 | 383 | 2:1 | 4 | 154 | Do. |
| 5f | 32c | 113 | B | 1.1 | 1.1 | 114 | 2:1 | 3.5 | 154 | Do. |
| 6f | 42c | 335 | B | 11 | 3.5 | 346 | 2:1 | 4 | 150 | Do. |
| 7f | 50c | 375 | B | 11 | 3.9 | 386 | 2:1 | 4 | 160 | Do. |
| 8f | 60c | 271 | B | 5.5 | 2.8 | 277 | 2:1 | 4 | 158 | Do. |
| 9f | 68c | 314 | B | 5.5 | 3.2 | 320 | 2:1 | 4.5 | 152 | Do. |
| 10f | 80c | 363 | B | 5.5 | 3.7 | 369 | 2:1 | 4.5 | 160 | Do. |
| 11f | 2d | 391 | B | 11 | 4.0 | 402 | 2:1 | 4 | 158 | Do. |
| 12f | 10d | 279 | B | 5.5 | 2.9 | 285 | 2:1 | 4 | 153 | Do. |
| 13f | 13d | 363 | B | 5.5 | 3.7 | 369 | 2:1 | 4 | 155 | Do. |
| 14f | 18d | 100 | B | 1.1 | 1.0 | 101 | 2:1 | 3 | 155 | Do. |
| 15f | 32d | 152 | B | 1.1 | 1.5 | 153 | 2:1 | 4 | 158 | Do. |

Table IX

| Ex. No. | Oxyalkyl. resin condensate | Prob. mol. weight of reaction product | Amount of product, grs. | Amount of solvent |
|---|---|---|---|---|
| 1e | 1c | 4,830 | 2,415 | 1,210 |
| 2e | 10c | 7,870 | 3,935 | 1,970 |
| 3e | 20c | 11,210 | 2,240 | 1,120 |
| 4e | 29c | 15,440 | 3,090 | 1,540 |
| 5e | 32c | 20,980 | 2,298 | 1,150 |
| 6e | 42c | 7,070 | 3,535 | 1,770 |
| 7e | 50c | 7,870 | 3,935 | 1,965 |
| 8e | 60c | 11,210 | 2,240 | 1,120 |
| 9e | 68c | 12,930 | 2,385 | 1,290 |
| 10e | 80c | 14,880 | 2,975 | 1,490 |
| 11e | 2d | 8,180 | 4,090 | 2,045 |
| 12e | 10d | 11,530 | 2,300 | 1,150 |
| 13e | 13d | 14,880 | 2,980 | 1,490 |
| 14e | 18d | 20,370 | 2,040 | 1,020 |
| 15e | 32d | 30,720 | 3,070 | 1,535 |

Table X

| Ex. No. | Oxyalkyl. resin condensate | Prob. mol. weight of reaction product | Amount of product, grs. | Amount of solvent |
|---|---|---|---|---|
| 1f | 1c | 4,680 | 2,340 | 1,170 |
| 2f | 10c | 7,720 | 3,850 | 1,925 |
| 3f | 20c | 11,060 | 2,212 | 1,106 |
| 4f | 29c | 15,290 | 3,080 | 1,530 |
| 5f | 32c | 22,830 | 3,280 | 1,140 |
| 6f | 42c | 6,920 | 3,460 | 1,730 |
| 7f | 50c | 7,720 | 3,860 | 1,930 |
| 8f | 60c | 11,060 | 2,210 | 1,105 |
| 9f | 68c | 12,780 | 2,556 | 1,280 |
| 10f | 80c | 14,730 | 2,946 | 1,470 |
| 11f | 2d | 8,030 | 4,015 | 2,010 |
| 12f | 10d | 11,380 | 2,276 | 1,140 |
| 13f | 13d | 14,730 | 2,946 | 1,470 |
| 14f | 18d | 20,220 | 2,020 | 1,010 |
| 15f | 32d | 30,570 | 3,057 | 1,530 |

At times we have found a tendency for an insoluble mass to form or at least to obtain incipient cross-linking or gelling even when the molal ratio is in the order of 2 moles of resin to one of diepoxide. We have found this can be avoided by any one of the following procedures or their equivalent. Dilute the resin or the diepoxide, or both, with an inert solvent, such as xylene or the like. In some instances an oxygenated solvent, such as the diethylether of ethyleneglycol may be employed. Another procedure which is helpful is to reduce the amount of catalyst used, or reduce the temperature of reaction by adding a small amount of initially lower boiling solvent, such as benzene, or use benzene entirely. Also, we have found it desirable at times to use slightly less than apparently the theoretical amount of diepoxide, for instance, 90% to 95% instead of 100%. The reason for this fact may reside in the possibility that the molecular weight dimensions on either the resin molecule or the diepoxide molecule actually may vary from the true molecular weight by several percent.

The condensate can be depicted in a simplified form which, for convenience, may be shown thus:

(Amine)CH₂(Resin)CH₂(Amine)

If such product is subjected to oxyalkylation reaction involves the phenolic hydroxyls of the resin structure and, thus, can be depicted in the following manner:

(Amine)CH₂(Oxyalkylated Resin)CH₂(Amine)

Following such simplification the reaction with a polyepoxide, and particularly a diepoxide, would be depicted thus:

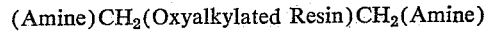
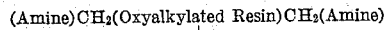
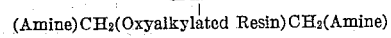

in which D. G. E. represents a diglycidyl ether as specified.

As has been pointed out previously, the condensation reaction may produce other products, including, for example, a product which may be indicated thus in light of what has been said previously:

[(Amine)CH₂(Resin)]

This product, since it is susceptible to oxyalkylation by means of the oxyalkylated phenolic hydroxyl groups and depending on the selection of the amine, may be susceptible to oxyalkylation in event a hydroxylated amine or polyamine has been used, and may be indicated in the following manner:

[Oxyalkylated(Amine)CH₂(Resin)]

When a diglycidyl ether is employed one would obviously obtain compounds in which two molecules of the kind described immediately preceding are united in a manner comparable to that previously described, which may be indicated thus:

Likewise, it is obvious that the two different types of oxyalkylation-susceptible compounds may combine so as to give molecules which may be indicated thus:

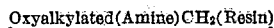
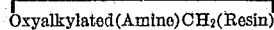
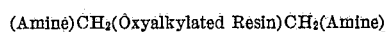
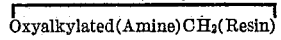
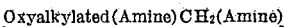
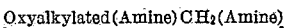
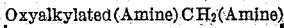
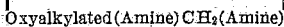
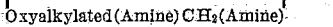
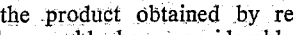
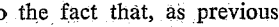

Actually, the product obtained by reaction with a diglycidyl ether could show considerably greater complexity due to the fact that, as previously pointed out, the condensate reaction probably does not yield a hundred percent condensate in absence of other byproducts. All this simply emphasizes one fact, to wit, that there is no suitable method of characterizing the final reaction product except in terms of method of manufacture.

PART 7

As to the use of conventional demulsifying agents reference is made to U. S. Patent No. 2,626,929, dated January 7, 1943, to De Groote, and particulary to Part Three. Everything that appears therein applies with equal force and effect to the instant process, noting only that where reference is made to Example 13b in said text beginning in column 15 and ending in column 18, reference should be to Example 3e, herein described.

PART 8

The products, compounds, or the like, herein described can be employed for various purposes and particularly for the resolution of petroleum emulsions of the water-in-oil type as described in detail in Part 7, preceding.

Such products can be reacted with alkylene imines, such as ethylene imine or propylene imine, to produce cation-active materials. Instead of an imine one may employ what is a somewhat equivalent material, to wit, a dialkylaminoepoxypropane of the structure

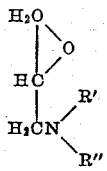

wherein R' and R'' are alkyl groups.

It is not necessary to point out that, after reaction with a reactant of the kind described which introduces a basic nitrogen atom, the resultant product can be employed for the resolution of emulsions of the water-in-oil type described in Part 7 preceding, and also for other purposes described hereinafter.

Referring now to the use of the products obtained by reaction with a polyepoxide and certain specified oxyalkylated products obtained in the manner described in Part 6, preceding, it is to be noted that in addition to their use in the resolution of petroleum emulsions they may be used as emulsifying agents for oils, fats, and waxes, as ingredients in insecticide compositions, or as detergents and wetting agents in the laundering, scouring, drying, tanning and mordanting industries. They may also be used for preparing boring or metal-cutting oils and cattle dips, as metal pickling inhibitors, and for pharmaceutical purposes.

Not only do these oxyalkylated derivatives have utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and non-aqueous types. They may be used in connection with other processes where they are injected into an oil or gas well for purpose of removing a mud sheath, increasing the ultimate flow of fluid from the surrounding strata, and particularly in secondary recovery operations using aqueous flood waters. These derivatives also are suitable for use in dry cleaners' soaps.

More specifically, such products, depending on the nature of the initial resin, the particular monoepoxide selected and the ratio of monoepoxide to resin, together with the particular polyepoxide employed, result in a variety of materials which are useful as wetting agents or surface tension reducing agents; as detergents, emulsifiers or dispersing agents; as additives for lubricants, both of the natural petroleum type and the synthetic type, as additives in the flotation of ores, and at times as aids in chemical reactions insofar that demulsification is produced between the insoluble reactants. Furthermore, such products can be used for a variety of other purposes, including use as corrosion inhibitors, defoamers, asphalt additives, and at times even in the resolution of oil-in-water emulsions. They serve at times as mutual solvents promoting a homogeneous system from two otherwise insoluble phases.

The products herein described can be reacted with polycarboxy acids, such as phthalic acid or anhydride, maleic acid or anhydride, diglycolic acid, and various tricarboxy and tetracarboxy acids so as to yield acylated derivatives, particularly if one employs one mole of the polycarboxy acid for each reactive hydroxyl radical present in the final polyepoxide-treated product. Thus, one obtains a comparatively large molecule in which there is a plurality of carboxyl radicals. Such acidic fractional esters are suitable for the resolution of petroleum emulsions of the water-in-oil type as herein described.

Having thus described our invention what we claim as new and desire to secure by Letters Patent is:

1. A three-step manufacturing process involving (1) condensation; (2) oxyalkylation with a monoepoxide; and (3) oxyalkylation with a polyepoxide; said first manufacturing step being a method of producing a resin condensate by (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

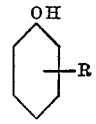

in which R is a saturated aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat stable and oxyalkylation-susceptible; followed as a second step by (B) oxyalkylation by means of an alpha-beta alkylene oxide having not more than 4 carbon atoms and selected from the class consisting of ethylene oxide, propylene oxide, butylene oxide, glycide and methylglycide to produce a monoepoxide oxyalkylated resin condensate; and then completing the reaction by a third step of (C) reacting said monoepoxide oxyalkylated resin condensate with nonaryl hydrophile polyepoxides containing at least two 1,2-epoxy rings and having two terminal 1,2-epoxy rings obtained by replacement of an oxygen-linked hydrogen atom in a water-soluble polyhydric alcohol by the radical

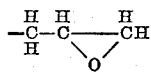

said polyepoxides being free from reactive functional groups other than 1,2-epoxy and hydroxyl groups and characterized by the fact that the divalent linkage uniting the terminal oxirane rings is free from any radical having more than 4 uninterrupted carbon atoms in a single chain; with the further proviso that said reactive monoepoxide-oxyalkylated resin condensate and nonaryl polyepoxides be members of the class consisting of non-thermosetting organic solvent-soluble liquids and solids melting below the point of pyrolysis; with the added proviso that the reaction product be a member of the class of solvent-soluble liquids and solids melting below the point of pyrolysis; said reaction between the monoepoxide-oxyalkylated resin condensate and the nonaryl polyepoxide being conducted below the pyrolytic point of the reactants and the resultants of reaction; and with the final proviso that the ratio of reactants be 2 moles of the oxyalkylated resin condensate to 1 mole of the nonaryl polyepoxide.

2. A three-step manufacturing process involving (1) condensation; (2) oxyalkylation with a monoepoxide; and (3) oxyalkylation with a polyepoxide; said first manufacturing step being a method of producing a resin condensate by (A) condensing (a) an oxyalkylation-susceptible, fusible, nonoxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

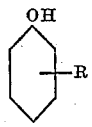

in which R is a saturated aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed as a second step by (B) oxyalkylation by means of an alpha-beta alkylene oxide having not more than 4 carbon atoms and selected from the class consisting of ethylene oxide, propylene oxide, butylene oxide, glycide and methylglycide to produce a monoepoxide oxyalkylated resin condensate; and then completing the reaction by a third step of (C) reacting said monoepoxide oxyalkylated resin condensate with nonaryl hydrophile polyepoxides containing at least two 1,2-epoxy rings and having two terminal 1,2-epoxy rings obtained by replacement of an oxygen-linked hydrogen atom in a water-soluble polyhydric alcohol by the radical

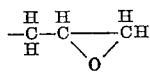

said polyepoxides being free from reactive functional groups other than 1,2-epoxy and hydroxyl groups and characterized by the fact that the divalent linkage uniting the terminal oxirane rings is free from any radical having more than 4 uninterrupted carbon atoms in a single chain; said polyepoxides being characterized by having present not more than 20 carbon atoms; with the further proviso that said reactive monoepoxide-oxyalkylated resin condensate and nonaryl polyepoxides be members of the class consisting of non-thermosetting organic solvent-soluble liquids and solids melting below the point of pyrolysis; with the added proviso that the reaction product be a member of the class of solvent-soluble liquids and solids melting below the point of pyrolysis; said reaction between the monoepoxide-oxyalkylated resin condensate and the nonaryl polyepoxide being conducted below the pyrolytic point of the reactants and the resultants of reaction; and with the final proviso that the ratio of reactants be 2 moles of the oxyalkylated resin condensate to 1 mole of the nonaryl polyepoxide.

3. A three-step manufacturing process involving (1) condensation; (2) oxyalkylation with a monoepoxide; and (3) oxyalkylation with a diepoxide; said first manufacturing step being a method of producing a resin condensate by (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

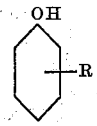

in which R is a saturated aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed as a second step by (B) oxyalkylation by means of an alpha-beta alkylene oxide having not more than 4 carbon atoms and selected from the class consisting of ethylene oxide, propylene oxide, butylene oxide, glycide and methylglycide to produce a monoepoxide oxyalkylated resin condensate; and then completing the reaction by a third step of (C) reacting said monoepoxide oxyalkylated resin condensate with nonaryl hydrophile diepoxides containing two terminal 1,2-epoxy rings obtained by replacement of an oxygen-linked hydrogen atom in a water-soluble polyhydric alcohol by the radical

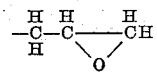

said diepoxide being free from reactive functional groups other than 1,2-epoxy and hydroxyl groups and characterized by the fact that the divalent linkage uniting the terminal oxirane rings is free from any radical having more than 4 uninterrupted carbon atoms in a single chain; said diepoxides being characterized by having present not more than 20 carbon atoms; with the further proviso that said reactive monoepoxide-oxyalkylated resin condensate and nonaryl diepoxides be members of the class consisting of non-thermosetting organic solvent-soluble liquids and solids melting below the point of pyrolysis; with the added proviso that the reaction product be a member of the class of oxyalkylation- and acylation-susceptible solvent-soluble liquids and solids melting below the point of pyrolysis; said reaction between the monoepoxide-oxyalkylated resin condensate and the nonaryl diepoxide being conducted below the pyrolytic point of the reactants and the resultants of reaction; and with the final proviso that the ratio of reactants be 2 moles of the oxyalkylated resin condensate to 1 mole of the nonaryl diepoxide.

4. The process of claim 3 wherein the diepoxide contains at least one reactive hydroxyl radical.

5. A three-step manufacturing process involving (1) condensation; (2) oxyalkylation with a monoepoxide; and (3) oxyalkylation with a diepoxide; said first manufacturing step being a method of producing a resin condensate by (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol;

said resin being formed in the substantial absence of trifunctional phenols; said phenol being of the formula

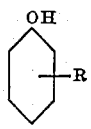

in which R is a saturated aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed as a second step by (B) oxyalkylation by means of an alpha-beta alkylene oxide having not more than 4 carbon atoms and selected from the class consisting of ethylene oxide, propylene oxide, butylene oxide, glycide and methylglycide to produce a monoepoxide oxyalkylated resin condensate; and then completing the reaction by a third step of (C) reacting said monoepoxide oxyalkylated resin condensate with a hydroxylated diepoxypolyglycerol containing two terminal 1,2-epoxy rings and having not more than 20 carbon atoms; with the further proviso that said monoepoxide-oxyalkylated resin condensate and said hydroxylated diepoxyglycerol be members of the class consisting of non-thermosetting organic solvent-soluble liquids and solids melting below the point of pyrolysis; with the added proviso that the reaction product be a member of the class of solvent-soluble liquids and solids melting below the point of pyrolysis; said reaction between the monoepoxide-oxyalkylated resin condensate and the hydroxylated diepoxypolyglycerol being conducted below the pyrolytic point of the reactants and the resultants of reaction; and with the final proviso that the ratio of reactants be 2 moles of the oxyalkylated resin condensate to 1 mole of the hydroxylated diepoxyglycerol.

6. The method of claim 5 wherein the hydroxylated diepoxypolyglycerol has not over 5 glycerol nuclei.

7. The method of claim 5 wherein the hydroxylated diepoxypolyglycerol has not over 5 glycerol nuclei and the difunctional monohydric phenol employed in forming the initial phenol-aldehyde resin is para-substituted.

8. The method of claim 5 wherein the hydroxylated diepoxypolyglycerol has not over 5 glycerol nuclei, and the difunctional monohydric phenol employed in forming the initial phenol-aldehyde resin is para-substituted and contains at least 4 and not over 14 carbon atoms in the substituent group.

9. The method of claim 5 wherein the hydroxylated diepoxypolyglycerol has not over 5 glycerol nuclei, and the difunctional monohydric phenol employed in forming the initial phenol-aldehyde resin is para-substituted and contains at least 4 and not over 14 carbon atoms in the substituent group, and the aldehyde employed in forming the initial phenol-aldehyde resin is formaldehyde.

10. The method of claim 5 wherein the hydroxylated diepoxypolyglycerol has not over 5 glycerol nuclei, and the difunctional monohydric phenol employed in forming the initial phenol-aldehyde resin is para-substituted and contains at least 4 and not over 14 carbon atoms in the substituent group, and the aldehyde employed in forming the initial phenol-aldehyde resin is formaldehyde, and the total number of phenolic nuclei in the initial resin are not over 5.

11. The product obtained by the method described in claim 1.

12. The product obtained by the method described in claim 10.

No references cited.